(12) United States Patent
Heindl et al.

(10) Patent No.: US 7,527,456 B2
(45) Date of Patent: May 5, 2009

(54) CONNECTING PROFILED ELEMENT FOR CONNECTING SHEET PILES TO CARRIER ELEMENTS

(75) Inventors: Richard Heindl, Munich (DE); Rob R. Wendt, Rapid City, SD (US); Georg Wall, Munich (DE)

(73) Assignee: Pile Pro, LLC, Rapid, SD (US)

( * ) Notice: Subject to any disclaimer, the term of this patent is extended or adjusted under 35 U.S.C. 154(b) by 345 days.

(21) Appl. No.: 11/596,341

(22) PCT Filed: May 2, 2005

(86) PCT No.: PCT/EP2005/004757

§ 371 (c)(1),
(2), (4) Date: Dec. 13, 2006

(87) PCT Pub. No.: WO2005/111315

PCT Pub. Date: Nov. 24, 2005

(65) Prior Publication Data

US 2007/0243027 A1    Oct. 18, 2007

(30) Foreign Application Priority Data

May 14, 2004   (DE) ................ 10 2004 024 103

(51) Int. Cl.
*E02D 5/02* (2006.01)
*E02D 17/00* (2006.01)

(52) U.S. Cl. .............. 405/279; 405/274; 405/285; D8/382; 403/403

(58) Field of Classification Search ........... 405/274, 405/277, 278, 279, 285; D8/382; 403/66, 403/75, 76, 84, 90, 403
See application file for complete search history.

(56) References Cited

U.S. PATENT DOCUMENTS 1,431,273 A * 10/1922 Webb et al. ............... 405/279
1,431,274 A * 10/1922 Webb et al. ............... 405/279
1,690,499 A * 11/1928 Nolte ....................... 405/279

(Continued)

FOREIGN PATENT DOCUMENTS

DE    195 43 084 A1    11/1995

(Continued)

*Primary Examiner*—Tara L. Mayo
(74) *Attorney, Agent, or Firm*—Milde & Hoffberg, LLP

(57) ABSTRACT

A rod-type connecting profiled element (10) for connecting sheet piles to carrier elements comprises a central strip (12) that separates two opposing connecting profiled elements (16, 18), each of which respectively forms a saw (24, 42). One connecting profiled element is embodied as a plug-in profiled element (16) for the carrier element and the other connecting profiled element is embodied as a receiving profiled element (18) for connecting a sheet pile. The central strip (12) comprises, on the side of the receiving profiled element (18), a central section (14) having a straight plane inner wall (30) to which a first short end section (32) is connected on one side, said short end section protruding past the central section (14) at an angle of approximately 90°, and being connected thereto by means of a transition section (36) having an inner wall with a cross-section that follows a quadrant. A hook strip (34) is arranged on the other side of the plane central section (14) as a second end section oriented in the same direction as the first end section (32).

14 Claims, 4 Drawing Sheets

U.S. PATENT DOCUMENTS

| | | | | |
|---|---|---|---|---|
| 1,837,787 A | * | 12/1931 | Meiser | 405/279 |
| 1,851,864 A | * | 3/1932 | Nolte | 405/279 |
| 1,918,886 A | * | 7/1933 | Amand | 405/279 |
| 2,104,490 A | * | 1/1938 | Kohler et al. | 405/279 |
| 6,042,306 A | * | 3/2000 | Arndts et al. | 405/279 |
| 2002/0102131 A1 | * | 8/2002 | Wall | 403/363 |

FOREIGN PATENT DOCUMENTS

| | | |
|---|---|---|
| DE | 197 16 685 A1 | 4/1997 |
| DE | 201 21 712 U1 | 12/2001 |
| NL | 278975 | 11/1964 |

* cited by examiner

CONNECTING PROFILED ELEMENT FOR CONNECTING SHEET PILES TO CARRIER ELEMENTS

BACKGROUND OF THE INVENTION

The invention concerns a connecting profiled element according for attaching sheet piles to carrier elements, in particular to an I-beam. In addition, the invention according to the main subject of claim 13 also concerns a combination sheet pile wall with such a connecting profiled element.

So-called "combination sheet pile walls" can be built with carrier elements, sheet piles and the connecting profiled elements described above, whereby one or more sheet piles are used between two adjacent carrier elements. To connect the carrier elements to the sheet piles, a connecting profiled element is used with a central strip that separates two attachment profiled elements, which are designed in an opposite manner, using a jaw, and that is a part of both attachment profiled elements. The one profiled element is typically designed as a plug-in profiled element for the carrier element, and the other attachment profiled element as a receiving profiled element for an interlock of a sheet pile to be attached. The receiving profiled element has two end sections issuing from the central strip with at least one end section being designed as a hook strip.

Such a connecting profiled element is described, for example, in the German Patent DE-U1-201 21 712.

With the known combination sheet pile walls, there exists the problem that the interlocks of the sheet piles that engage in one another as well as the receiving profiled elements of the connecting profiled elements that engage with the interlocks of the sheet piles can only pivot in relation to each other in a very limited manner when viewed in the longitudinal direction due to the design of the interlocks and of the receiving profiled elements. The problem described above exists in particular with sheet piles with so-called LARSSEN interlocks, because due to the design of the LARSSEN interlocks, pivoting of the sheet piles and the connecting profiled elements to each other has thus far been hardly possible or has been possible in a very limited manner. However, pivoting the individual components of the combination sheet pile walls in relation to one another is very important because, for example, sheet pile walls and carrier elements have a tendency to draw aside or to twist in the longitudinal direction when being rammed into the ground with differing ground constitutions. If there is no sufficient pivoting ability between the engaging interlocks, there is a risk that the interlocks could disengage from the receiving profiled elements, and that the combination sheet pile wall cannot be erected properly.

SUMMARY OF THE INVENTION

It is, therefore an object of the invention to provide a connecting profiled element or a combination sheet pile wall, with such a connecting profiled element, respectively, that when used a combination sheet pile wall can be erected more easily, or that can be erected more easily compared to known combination sheet pile walls.

According to the invention, the central strip of the connecting profiled element includes on the side of the receiving profiled element a central section with a straight, flat inner wall followed on one side by a first, short end section, which protrudes from the central section at an angle of about 90° and is connected to it by a transition section, whose cross-section of the inner wall resembles a quarter-circle. Located on the other side of the straight flat center section is a hook strip as the second end section and pointing in the same direction as the first section. A first strip section with a somewhat semi-circular cross-section and an adjacent second, essentially straight strip section, which is bent off from a first strip section such that it is directed toward the central section of the central strip, form the hook strip.

The design of the receiving profiled element for the interlock of a sheet pile to be connected according to the invention, in particular a sheet pile to be connected using LARSSEN interlocks, has the effect that the interlock can be pivoted in a wide range in the receiving profiled element. The potential pivoting angle is in a range of more than 60°. With such a large pivoting angle, it is possible that when erecting a combination sheet pile wall, the adjacent carrier elements, e.g., I-beams can be twisted at a large angle in relation to each without tension arising in the combination sheet pile wall when ramming the sheet piles into the ground. These potential large pivoting angles between carrier elements and sheet piles allow also to erect a sheet pile wall with a large pivoting angle between adjacent wall sections such that no additional connecting elements are required in such a sheet pile wall.

The large potential pivoting angles between connecting profiled elements, carrier elements and sheet piles also avoids the high tensions resulting from ramming the individual elements into the ground that could otherwise lead to the disengaging of the engaged interlocks of the carrier elements, the sheet piles and the connecting profiled elements, which could compromise the stability of the combination sheet pile walls or their leak tightness in these locations.

With the connecting profiled element subject to the invention, the attachment profiled element is designed such that the individual elements of the combination sheet pile wall can be rammed into the ground securely, allowing to a large extent for compensation of deviations of the sheet pile wall from target dimensions.

In addition, the connecting profiled element subject to the invention allows for large pivoting angles in the combination sheet pile wall between adjacent carrier elements, in particular I-beams, for the sheet piles used. Pivoting can occur between adjacent carrier elements or between the sheet piles and the carrier elements hooked into them, for example when the carrier elements are rammed into the ground if the ground has irregular soil conditions due to rock formations, erratics or the like. Because of this, the carrier elements and sheet piles may be twisted at their longitudinal axis when rammed into the ground. Such twisting or torsion is compensated for by the design of the connecting profiled elements subject to the invention. By contrast, conventional connecting profiled elements often allow only a very limited pivoting angle such that the sheet piles disengage from the connecting profiled elements when rammed into the ground and the sheet pile wall is left untight in particular to liquids at these locations. Furthermore, the stability of the sheet pile wall is no longer given to the calculated extent if the interlocks of the sheet piles disengage from the connecting profiled elements during the ramming process.

Since large pivoting angles are possible between the carrier elements and the attached sheet piles due to the connecting profiled elements subject to the invention, they can also be used to deliberately erect combination sheet pile walls in a circular or other closed formation or combination sheet pile walls with a distinct corner without the need for additional components.

According to one preferred embodiment of the invention, the second essentially straight strip section of the hook strip is bent to such an extent that it is pointing in the direction of the central strip where said central strip transitions in the transition section into the first end section.

For attaching sheet piles, in particular sheet piles with LARSSEN interlocks, a sufficiently large jaw must be provided at the connecting profiled element such that on the one hand the sheet pile can easily be inserted into the attachment profiled element, and on the other hand, the interlock does not disengage from the attachment profiled element during the ramming process. Essentially, this is achieved in that the connecting profiled element surrounds the interlock of the sheet pile to be attached in a generous and wide manner and whereby it is ensured that for the extreme pivoting angles between the connecting profiled element and the attached sheet pile, a three-point connection is established at all times between said two components. Such a three-point connection prevents the disengaging of the engaging interlocks during the ramming process, such that the stability of the combination sheet pile wall and its leak tightness remain ensured.

According to another preferred embodiment, the end of the first short end section and the end of the second essentially straight strip section of the hook strip are at approximately the same distance from the flat straight central section of the central strip, whereby the distance of the end of the hook strip is preferably slightly greater than the distance of the end of the first short end section from the central strip.

The end of the second strip section of the hook strip is preferably at about the height of the center of the central section of the central strip, forming a sufficiently large jaw in particular for hooking in the sheet piles with LARSSEN interlocks.

The plug-in profiled element provided at the connecting profiled element can be designed in different ways depending on the respective carrier element being used. For example, if the connecting profiled element is used with a carrier element that has fastening sections provided that have approximately wedge-shaped fastening sections, such as wedge shaped beams, the plug-in profiled element is, at a particularly preferred embodiment of the connecting profiled element subject to the invention, defined by a central strip, a straight jaw strip that extends from one side of the central strip at an angle of 90° and an angled second jaw strip that extends from the other side of the central strip and points in the direction of the first straight jaw strip.

With an alternative advancement of the connecting profiled element subject to the invention, the plug-in profiled element exhibits a cross-section resembling approximately a dovetail-shaped inner cross-section, which is defined by the central strip as well as two mirror-symmetrically converging, angled jaw strips that protrude from the two edges of the central strip. Through the dovetail-shaped inner cross-section, the connecting profiled element can also be attached to carrier elements with fastening sections that are wedge-shaped in their outer cross-section. With this dovetail-shaped design of the inner cross-section, it is possible to attach the connecting profiled element to the wedge-shaped fastening section with the jaw of the receiving profiled element pointing away from the carrier element as well as pointing in the direction of the carrier element, without the need to provide connecting profiled elements with differently designed plug-in profiled elements. With regard to the flat side of the central strip, the two jaw strips run preferably with a tilt angle in a range of about 30 to 50°, with a preferred tilt angle of 35°.

If a carrier element is used, where the fastening sections have an approximately rectangular cross-section, the plug-in profiled element as an additional alternative embodiment of the connecting profiled element subject to the invention exhibits in a cross-sectional view two jaw strips protruding from the strip and running at least closely parallel to one another between which the carrier element must be inserted with its fastening section.

In an additional particularly preferred embodiment of the connecting profiled element according to the invention, the plug-in profiled element and the receiving profiled element are formed at the central strip offset in relation to one another. The effect of this is that the carrier element and the sheet pile can be connected to each other offset to one another in order to achieve an as smooth as possible contour of the combination sheet pile wall along a specified direction.

Finally another aspect of the invention concerns a combination sheet pile wall, for which the connecting profiled element according to the invention is used.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
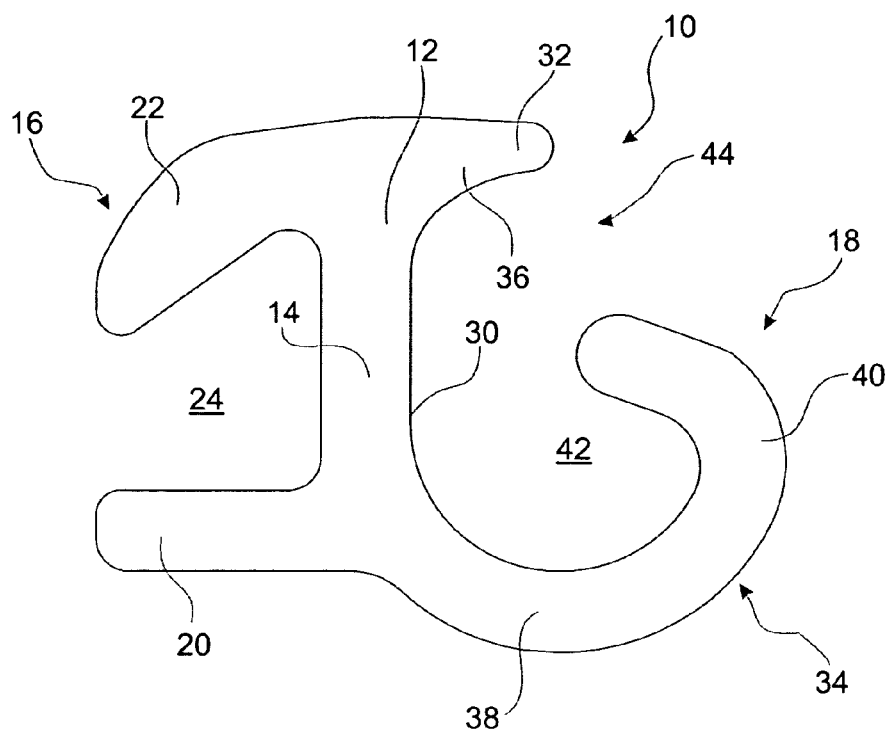
FIG. 1 is a top view of a first exemplary embodiment of a connecting profiled element subject to the invention.

The preferred embodiments of the present invention will now be described with reference to FIGS. 1-7 of the drawings. Identical elements in the figures are designated with the same reference numerals.

Figure 2:
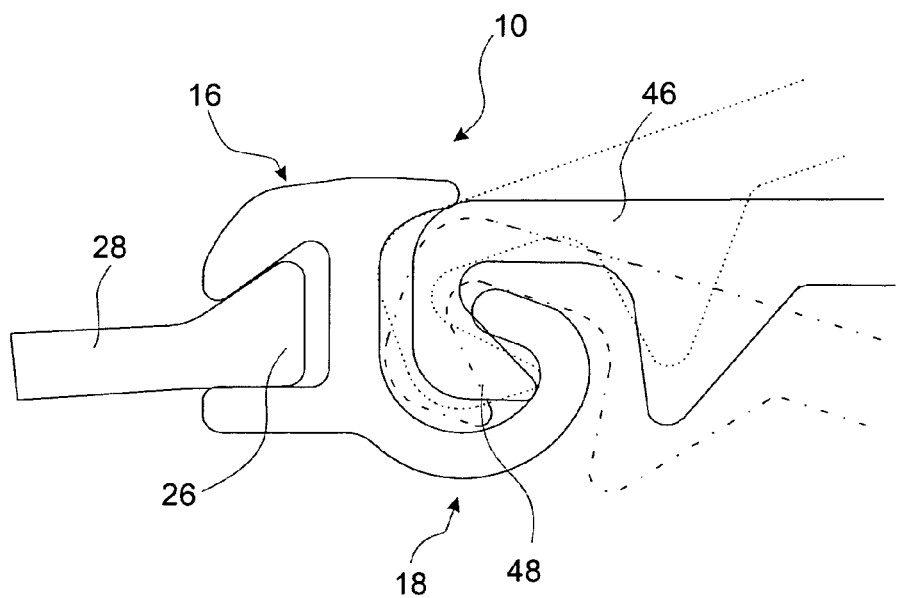
FIG. 2 is a top view of the connecting profiled element presented in FIG. 1 in a condition that is attached to an I-beam and to a LARSSEN interlock of a sheet pile.

FIGS. 1 and 2 show an exemplary embodiment of a connecting profiled element 10 subject to the invention. The connecting profiled element 10 exhibits a central strip 12 with a straight, flat central section 14 that separates two attachment profiled elements, a plug-in profiled element 16 and a receiving profiled element 18 from each other.

The plug-in profiled element 16 is defined by the central strip 12, a first straight jaw strip 20, which issues from the lower edge shown in FIG. 1 at an angle of 90° and a second bent jaw strip 22, which issues from the other side of the central strip 12 in the direction of the first straight jaw strip 20. The two jaw strips 20 and 22 end in a plane that runs somewhat parallel to the central strip 12 and form together with said central strip a jaw 24 with an approximate trapezoidal cross-section. This trapezoidal cross-section is adapted to the cross-section of a fastening section 26 of an I-beam 28, such that the plug-in profiled element 16 can be hooked onto the I-beam 28 with little play, as shown in FIG. 2.

The receiving profiled element 18 is defined by a straight, flat inner wall 30 of the central section 14 of the central strip 12, a short end section 32 that follows at the top side shown in FIG. 1 the central section 14, and a hook strip 34 that issues from the opposite side of the central section 14. The straight, flat inner wall 30 transitions on the side of the short end section 32 into a transition section 36, that describes in its cross-section approximately a quarter circle. The short end section 32 is approximately perpendicular to the imagined central plane of the central section 14.

The hook strip 34 on the opposite side, which essentially forms a second end section that points in the same direction as the first end section 32, exhibits a first strip section 38 with an essentially semi-circular cross-section, which is followed by an essentially straight second strip section 40 that is bent strongly such that it points toward the flat central section 14 of the central strip 12. If one were to extend the center line of the straight second strip section 40, it would strike the flat inner wall 32 of the central section 14 approximately in that region, where the central section 14 transitions into the transition section 36 of the short first end section 32.

The end of the short end section 32 is approximately in a plane parallel to the flat wall 32, where the end of the second straight strip section 40 is located as well. The distance of the end of the second strip section 40 to the inner wall 30 of the central section 14 of the central strip 12 can be slightly greater than the distance of the end of the short end section 32 to this flat inner wall 30.

As shown in FIG. 2, such a configuration of the receiving profiled element 18 forms a jaw 42 with a jaw opening 44 between the ends of this end section 32 and the second strip section 40, in which a Z-sheet pile 46 with a LARSSEN interlock 48 is generously received.

Extreme pivoting angles of up to 70° are possible in the receiving profiled element 18, as is indicated by the dotted and dashed suggestion of the LARSSEN interlock 48 of the Z-sheet pile 46. The LARSSEN interlock 48 of the Z-sheet pile 46 rests at all times in three points at the inner wall of the receiving profiled element 18, such that a dependable hold is provided and disengaging of the LARSSEN interlock 48 from the receiving profiled element 18 is prevented during the ramming process.

Above, the plug-in profiled element 16 is presented with a trapezoidal cross-section. Of course, it is also possible to use other plug-in profiled elements that are adapted in their cross-section corresponding to the respective carrier element 28.

Figure 3:
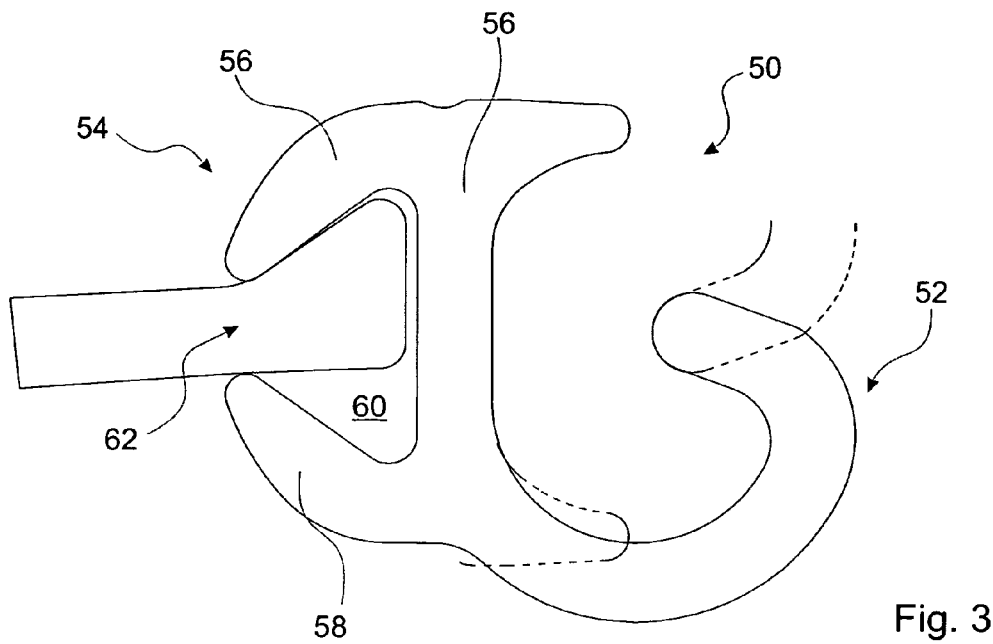
FIG. 3 is a top view of a first modified exemplary embodiment of the connecting profiled element subject to the invention that exhibits a dovetail-shaped plug-in profiled element in the inner cross-section.

For example FIG. 3 shows a modified embodiment of the connecting profiled element 10. With this connecting profiled element 50, the receiving profiled element 52 corresponds in its design to the receiving profiled element 18 of the connecting profiled element 10. The significant difference to the connecting profiled element 10 is the design of the plug-in profiled element 54 that is used to attach the connecting profiled element 50 to the I-beam 28.

For example, the two jaw strips 56 and 58 of the plug-in profiled element 54 converge under an angle of about 35° each, such that the plug-in profiled element 54 has an essentially dovetailed shape in the inner cross-section 60. Because of the dovetailed shape of the plug-in profiled element 54, the connecting profiled element 50 can be fastened at the fastening section 26 of the I-beam 28 pointing with the jaw opening 62 of the receiving profiled element 54 towards the inside or, as indicated with the dashed line presentation, pointing towards the outside.

Figure 4:
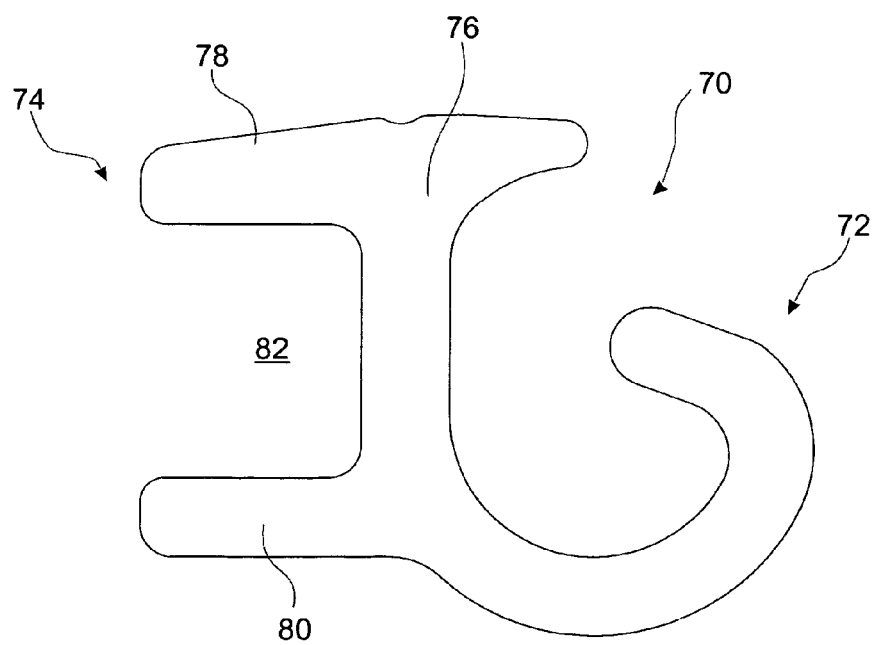
FIG. 4 is a top view of a second modified exemplary embodiment of the connecting profiled element subject to the invention that exhibits a rectangular plug-in profiled element in the inner cross-section.

FIG. 4 shows a second modification of the connecting profiled element 10 presented in FIGS. 1 and 2. In this modified connecting profiled element 70, the receiving profiled element 72 corresponds to the receiving profiled element 18 as well.

The plug-in profiled element 74 of the connecting profiled element 70 exhibits, however, two jaw strips 78 and 80, which are mirror-symmetrical to each other, protruding from the central strip 76. This results in a jaw 82 with an essentially rectangular cross-section that is to be plugged onto a fastening section of a not shown carrier element with an essentially rectangular cross-section such as a conventional I-beam.

Figure 5:
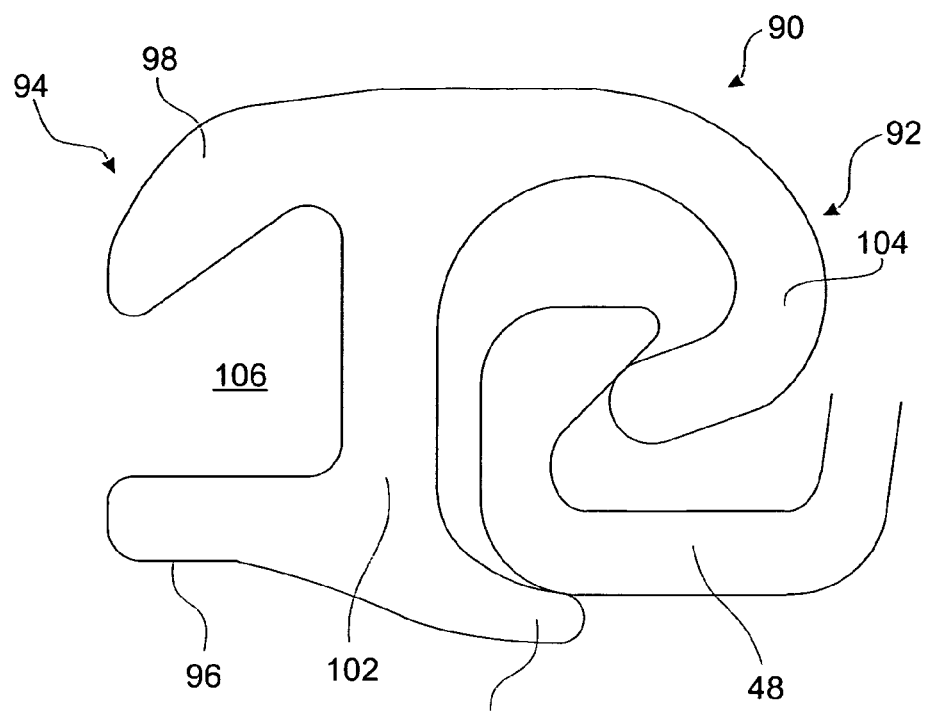
FIG. 5 is a top view of a third modified exemplary embodiment of the connecting profiled element subject to the invention, where the plug-in profiled element is provided mirror-inverted at the central strip when compared to the connecting profiled element presented in FIG. 1.

FIG. 5 shows a third modification of the connecting profiled element 10 presented in FIGS. 1 and 2. In this modified connecting profiled element 90, the receiving profiled element 92 corresponds to the design of the receiving profiled element 18 as well. Also the inner cross-section of the plug-in profiled element 94 corresponds to the inner cross-section of the plug-in profiled element 16. However, the two jaw strips 96 and 98 are designed mirror inverted with regard to the receiving profiled element 18, in contrast to the jaw strips 20 and 22 of the plug-in profiled element 16.

For example, the end section 100 of the receiving profiled element 92 transitions into the jaw strip 96 that protrudes at approximately a right angle from the central strip 102, while the hook strip 104 transitions into the angled jaw strip 98 of the plug-in profiled element 94. This has the effect that the connecting profiled element 90 with the jaw 106 of its plug-in profiled element 94 can be attached at the I-beam 28 pointing inward.

Figure 6:
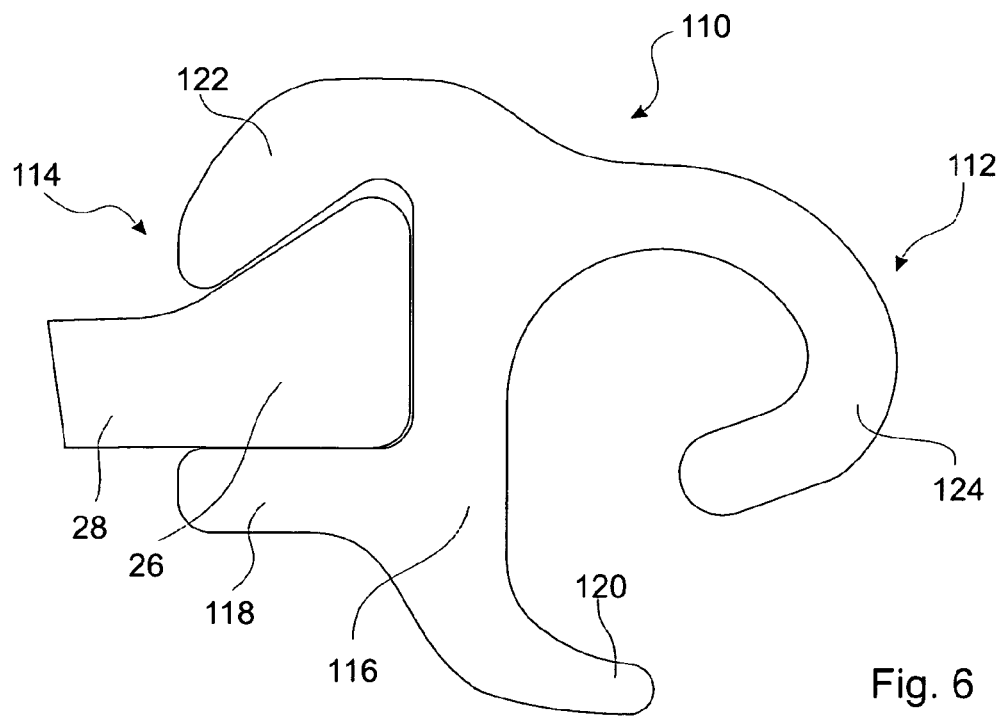
FIG. 6 is a top view of a fourth modified exemplary embodiment of the connecting profiled element subject to the invention, where the plug-in profiled element is provided mirror-inverted at the central strip when compared to the connecting profiled element presented in FIG. 1 and with regard to the receiving profiled element is offset at the strip in the longitudinal direction of the central strip.

FIG. 6 shows a fourth modification of the connecting profiled element 10 with a structure that essentially corresponds to the structure of the connecting profiled element 90, shown in FIG. 5. With this connecting profiled element 110, a receiving profiled element 112 is provided that corresponds to the receiving profiled element 92. The general arrangement of the plug-in profiled element 114 corresponds to the arrangement of the plug-in profiled element 94 as well. However, the plug-in profiled element 114 is designed offset towards the top opposite the receiving profiled element 112 along the central strips 116, such that the jaw strip 118, shown at the bottom of FIG. 6 is offset toward the top viewed in the longitudinal direction of the strip 116, opposite the end section 120 of the receiving profiled element 112, while the jaw strip 122 is offset toward the top opposite the hook strip 124.

It should be noted here that depending on the purpose of the application, the dimension by which the plug-in profiled element 114 can be offset in relation to the receiving profiled element 112, might vary.

Figure 7:
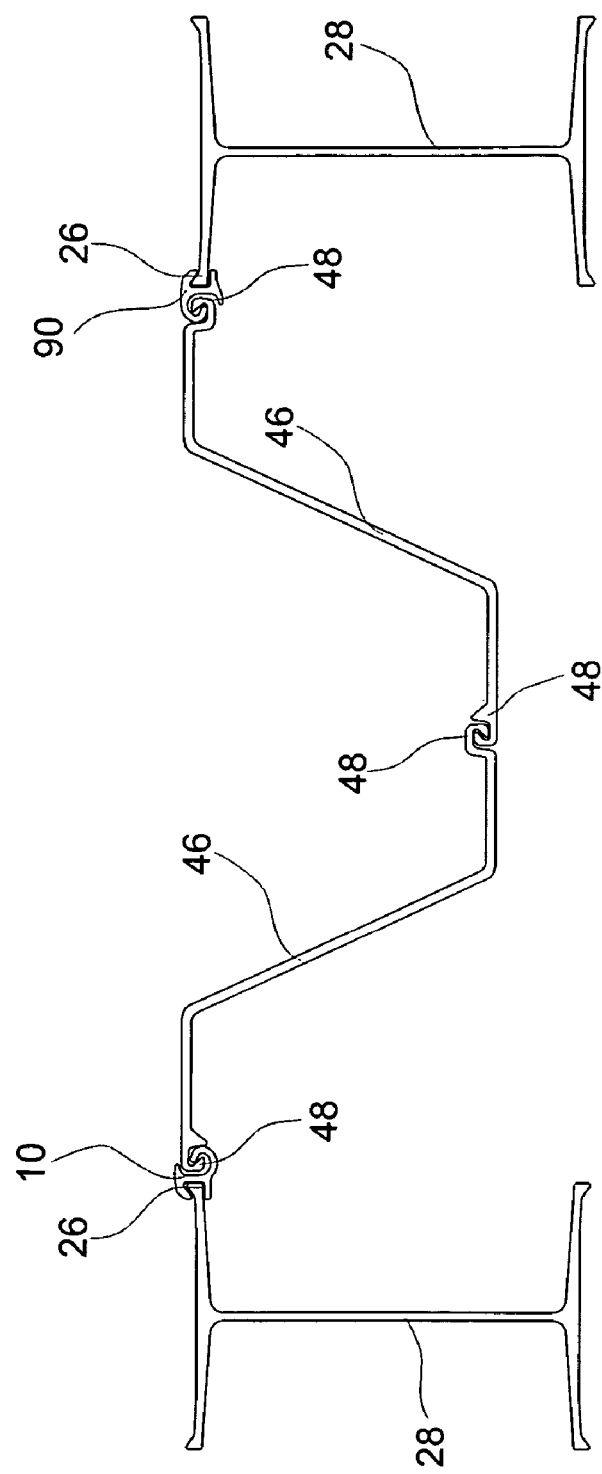
FIG. 7 is a top view of a portion of a combination sheet pile wall with two carrier elements and two Z-sheet piles with LARSSEN interlocks inserted between them, and where the two connecting profiled elements shown in FIGS. 1 and 5 are used.

FIG. 7 shows a section of a combination sheet pile wall, which is constructed of two I-beams 28 and two Z-sheet piles 46 using LARSSEN interlocks 48, whereby the two directly adjacent LARSSEN interlocks 48 Z-sheet piles 46 are hooked together.

To fasten the sheet piles 46 shown in FIG. 7 on the left, the connecting profiled element 90 (cf. FIG. 5) is used in the shown exemplary embodiment and is hooked into the fastening section 26 of the I-beam 28 and engages with the LARSSEN interlock 48 of the Z-sheet pile 46 shown on the left.

The Z-sheet pile 46 shown in FIG. 7 on the right engages with the connecting profiled element 10 shown in FIG. 1, which is hooked into the I-beam 28 shown on the right.

By using the connecting profiled elements 10, 50, 70, 90 and/or 110 subject to the invention, extreme pivoting angles between the LARSSEN interlock of the Z-sheet piles 46 and the I-beam 28 can be realized. In this manner, it is possible to erect combination sheet pile walls in a closed formation or curved or with sharp corners, respectively. Even if the distances between adjacent I-beams 28 vary when ramming the individual I-beams 28 into the ground, or if the I-beams 28 are twisted in relation to one another, such offsets can be compensated for by using the connecting profiled elements 10, 50, 70, 90 and/or 110 subject to the invention.

Of course, U-sheet piles can also be used in place of the presented Z-sheet piles 46 and can be provided with LARSSEN interlocks or similarly designed interlocks in order to erect a combination sheet pile wall.

There has thus been shown and described a novel connecting profiled element for connecting sheet piles to carrier elements, and combined sheet piling comprising one such connecting profiled element which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A connecting profiled element with a consistent cross-section for attaching sheet piles to carrier elements, such as I-beams, in order to construct a combination sheet pile wall comprised of carrier elements and sheet piles inserted between two respective carrier elements, wherein the connecting profiled element comprises a central strip that separates two opposite attachment profiled elements, each with one jaw, from each other, and respectively form parts of both attachment profiled elements, wherein the one attachment profiled element is designed as a plug-in profiled element for the carrier element and the other attachment profiled element as a receiving profiled element for an interlock of a sheet pile to be attached, and the receiving profiled element exhibits on each side of the central strip end sections, of which at least one end section is designed as a hook strip, the improvement wherein the central strip exhibits on the side of the receiving profiled element a central section with a straight flat inner wall, which is followed on one side by a first short end section that protrudes at an angle of about 90° from the central section and is connected to it through a transition section, whose inner wall describes in its cross-section a quarter circle, and wherein on the other side of the flat central section the hook strip is located as a second end section, pointing in the same direction as the first end section, with said hook strip being formed by a first strip section with an essentially semi-circular cross-section, and adjacent to that is a second essentially straight strip section, which is bent such that it points to the central section of the central strip.

2. A connecting profiled element as set forth in claim 1, wherein the second strip section of the hook strip points towards the region of the central strip where it transitions into the transition section to the first end section.

3. A connecting profiled element as set forth in claim 1, wherein the end of the first short end section and the end of the second essentially straight strip section of the hook strip exhibit about the same distance from the flat, straight inner wall of the central section of the central strip.

4. A connecting profiled element as set forth in claim 3, wherein the distance of the end of the second essentially straight strip section of the hook strip from the straight flat inner wall of the central section of this central strip is slightly greater than the distance of the end of the first short end section.

5. A connecting profiled element as set forth in claim 1, wherein the end of the second strip section of the hook strip is about at the height of the center of the central section of the central strip.

6. A connecting profiled element as set forth in claim 1, wherein the receiving profiled element is designed in its dimensions for connecting to a LARSSEN-U-sheet pile that is to be attached.

7. A connecting profiled element as set forth in claim 1, wherein the plug-in profiled element is defined by the central strip, a first straight jaw strip that issues from one side of the central strip at an angle of 90°, and a bent second jaw strip that issues from the other side of the central strip in the direction of the first straight jaw strip.

8. A connecting profiled element as set forth in claim 7, wherein the bent second jaw strip and the short first end section are arranged directly adjacent to one another.

9. A connecting profiled element as set forth in claim 7, wherein the first straight jaw strip which protrudes from the central strip at an angle of 90° and the short first end section are arranged directly adjacent to one another.

10. A connecting profiled element as set forth in claim 1, wherein the plug-in profiled element exhibits an essentially dovetail-shaped inner cross-section that is defined by the central strip and two mirror-symmetrically converging bent jaw strips that protrude from the two edges of the central strip.

11. A connecting profiled element as set forth in claim 1, wherein the plug-in profiled element viewed in the cross-section of the connecting profiled element exhibits two jaw strips that protrude from the strip and run essentially parallel to one another, between which the carrier element is to be inserted with a fastening section.

12. A connecting profiled element as set forth in claim 1, wherein the plug-in profiled element and the receiving profiled element are designed offset in relation to one another at the central strip.

13. A combination sheet pile wall that is constructed of carrier elements, such as I-beams, and at least one sheet pile that is located between two respective carrier elements, and comprises a connecting profiled element located between them for connecting the carrier elements with the sheet pile, and wherein a receiving profiled element is formed that engages with a lock that is formed at the sheet pile, the improvement comprising a connecting profiled element according to claim 1.

14. A combination sheet pile wall as set forth in claim 13, wherein at least the interlock of the sheet pile that engages with the connecting profiled element is a LARSSEN interlock.

* * * * *